United States Patent [19]
Maly et al.

[11] Patent Number: 5,760,950
[45] Date of Patent: Jun. 2, 1998

[54] SCANNING CONFOCAL MICROSCOPE

[75] Inventors: Miroslav Maly, Prague 5; Pavel Vesely, Prague 9, both of Czech Rep.

[73] Assignee: Advanced Scanning, Ltd., Metairie, La.

[21] Appl. No.: 687,287

[22] Filed: Jul. 25, 1996

[51] Int. Cl.$^6$ .............................. G02B 21/00; G02B 21/06
[52] U.S. Cl. ............................ 359/368; 359/386; 359/389
[58] Field of Search .................................. 359/233, 235, 359/368, 381, 385, 386, 389

[56] References Cited

U.S. PATENT DOCUMENTS

| | | | |
|---|---|---|---|
| 4,919,516 | 4/1990 | Petrán et al. | 359/389 |
| 5,032,720 | 7/1991 | White | 250/236 |
| 5,067,805 | 11/1991 | Corle et al. | 359/235 |
| 5,162,941 | 11/1992 | Favro et al. | 359/386 |
| 5,177,512 | 1/1993 | Abe et al. | 351/221 |
| 5,517,352 | 5/1996 | Hill | 359/368 |

OTHER PUBLICATIONS

Boni, E. Elewiski, "Clinical Pearl: Diagnosis of onychomycosis, Pearls of Wisdom," American Academy of Dermatology, vol. 32, No. 3, pp. 500–501 (1995).

Robert Folberg et al., "The Morphologic Characteristics of Tumor Blood Vessels as a Marker of Tumor Progression in Primary Human Uveal Melanoma," Hum Pathol, vol. 23, No. 11, pp. 1298–1305 (Nov. 1992).

J.V. Jester et al., "Comparison of in vivo and ex vivo cellular structure in rabbit eyes dectected by tandem scanning microscopy," Journal of Microscopy, vol. 165, Pt. 1, pp. 169–181 (Jan. 1992).

S. C. Kaufman et al., "Diagnosis of Advanced Fuchs' Endothelial Dystrophy With the Confocal Microscope," American Journal of Opthalmology, vol. 116, No. 5, pp. 652–653 (Nov. 1993).

S. C. Kaufman et al., "Confocal microscopy: A new tool for the study of nail unit," American Academy of Dermatology, vol. 32, No. 4, pp. 668–669 (Apr. 1995).

(List continued on next page.)

Primary Examiner—Paul M. Dzierzynski
Assistant Examiner—Mark A. Robinson
Attorney, Agent, or Firm—Burns, Doane, Swecker & Mathis, LLP

[57] ABSTRACT

A scanning confocal microscope optical system overcomes the difficulties of previous devices and can be used in diagnostic applications that are inaccessible to previous devices. The optical system for forming an image of a subject illuminated by light from an illumination system includes a Nipkow disk that is perpendicular to a light propagation path and that has a surface upon which a plurality of pinholes are distributed substantially symmetrically about an axis perpendicular to the surface of the disk. The system further includes components for projecting an image of a first set of the pinholes onto a second set of the pinholes, the image being formed of light transmitted by the first set of the pinholes when the first set is illuminated by light that impinges on a first side of the disk. The system further includes a collective lens and a first objective lens for focussing light transmitted by the second set of the pinholes onto the subject and for collecting light reflected by the subject. The first objective lens has a large numerical aperture and light reflected by the subject passes through the second set of pinholes. Finally, the system may include a device for spinning the Nipkow disk about the axis.

13 Claims, 7 Drawing Sheets

OTHER PUBLICATIONS

M.S. Lemp et al., "Tandem–Scanning (Confocal) Microscopy of the Full Thickness Cornea," Cornea, vol. 4, No. 4, pp. 205–209 (1986).

J.W. Lichtman, "Confocal Microscopy," Scientific American, vol. 271, No. 2, pp. 40–45 (Aug. 1994).

Gillian Midgley et al., "Mycology of nail disorders," Journal of Amer. Acad. of Derma., vol. 31, No. 3, pt 2, pp. S68–S74 (Sep. 1994).

Hubert Pehamberger et al., "In Vivo Epiluminescence Microscopy: Improvement of Early Diagnosis of Melanoma," The Journal of Investigative Dermatology, Inc., vol. 100, No. 3, Issue 0022-202X, pp. 356S–362S (Mar. 1993).

G.E. Pierard et al., "Diagnostic Microscopique Des Onychomycoses," Ann. Dermatol. Venereol. vol. 121, pp. 25–29 (1994).

Milind Rajadhyaksha et al., "In Vivo Confocal Scanning Laser Microscopy of Human Skin," Journal of Investigative Dermatology, Inc., vol. 104, No. 6, pp. 946–952 (Jun. 1995).

Nardo Zaisa, "Onychomycosis," (Review Article), Derm, vol. 105, pp. 263–274 (Feb. 1972).

"Academy 95", American Academy of Dermatology, Program and Poster Exhibits, p. 51—with attachments that were unpublished (Jul. 1995).

"User Guide and Technical Reference", Optimas 5, vol. 1, pp. 1–75 (Nov. 1995).

W.B. Amos et al., "Use of confocal imaging in the study of biological structures," Applied Optics, vol. 26, No. 16, pp. 3239–3243 (Aug. 1987).

Vincent Barranco, "New Approaches to the Diagnosis and Management of Onychomycosis," International Journal of Dermatology, vol. 33, No. 4, pp. 292–299 (Apr. 1994).

R.W. Beuerman et al., "Quantification of Real–time Confocal Images of the Human Cornea," Imaging Techniques (Special Edition), pp. 1–19 (Jul. 1994).

R.W. Beuerman et al., "Correlation of In–Vivo Confocal Microscopy with SEM in Demonstrating Penetration of the Eye by Organic Foreign Body," Scanning 14 (Suppl II): II–44 (1992).

R.W. Beuerman et al., "Quantification of Confocal Images of the Corneal Surface," (1993).

P. Castano et al., "Three–dimensional reconstruction of the Meissner corpuscle of man," J. Anat., vol. 186, pp. 261–270, (1985).

H.D. Cavanagh et al., "Confocal Microscopy of the Living Eye," CLAO Journal, vol. 15, No. 1, pp. 65–73 (Jan. 1990).

S.J. Chew et al., "Early Diagnosis of Infectious Keratitis with In Vivo Real Time Confocal Microscopy," CLAO Journal, vol. 18, No. 3, pp. 197–201 (Jul. 1992).

S.J. Chew et al., "In Vivo Assessment of Corneal Stromal Toxicity By Tandem Scanning Confocal Microscopy," Lens and Eye Toxicity Research, 9(3&4), pp. 275–292 (1992).

S.J. Chew et al., "The Tandem Scanning Confocal Microscope as a Clinical Diagnostic Tool in Opthalmology," Scanning 14 (Suppl II):II–44 (1992).

P. Corcuff et al., "In vivo Vision of the Human Skin with Tandem Scanning Microscope," Dermatology, vol. 186, pp. 50–54 (1993).

M. Petran et al., "In Vivo Microscopy Using the Tandem Scanning Microscope," Annals New York Academy of Sciences, vol. 483, pp. 440–447 (1986).

M. Petrán et al., "The Tandem Scanning Reflected Light Microscope," Scanning, vol. 7, pp. 97–108 (1985).

SCANNING CONFOCAL MICROSCOPE

BACKGROUND

This invention relates to real-time, white light, confocal microscopes having Nipkow disks.

A central corneal ulcer is a true ocular emergency, threatening vision and the eye itself. Therefore, the rapid and accurate differentiation of infectious from noninfectious infiltrates and ulcers is necessary for efficacious treatment. Fortunately, ophthalmology is unique among clinical disciplines in that most diagnostic features are easily visible. The cornea, lens, and vitreous are transparent. The retina with its vessels and neurofiber layer are clearly exposed at the back of the eye.

Nevertheless, because an infecting organism often cannot be viewed directly, subjective criteria (such as the putative source of infection, presence and degree of limbal injection, suppuration, and the pattern of spread of the inflammation) must be used diagnostically. Distinguishing the major forms of infectious keratitis - bacterial, fungal, and amoebic, as well as sterile infiltrates - poses a critical challenge to the clinician. Although laboratory tests are essential to the management of these diseases, obtaining adequate culture samples from corneal scrapings or the more hazardous biopsy is difficult. Furthermore, the time required for a definitive identification by staining and/or culture, particularly of fungi and acanthamoeba, limits the ophthalmologist to the use of broad-spectrum and possibly ineffective antimicrobial therapy in the early stages of disorder.

Imaging systems like the well-known hand-held ophthalmoscope, slit-lamp microscope, fundus camera, and scanning laser ophthalmoscope are all used in daily activities in clinical ophthalmology. Today, the slit-lamp microscope is the principal diagnostic instrument in clinical ophthalmology and contact-lens practice, but the standard methods of imaging the eye produce images that are degraded in contrast and resolution. The low contrast of the slit-lamp microscope is due both to the inherently low-contrast tissue objects in the eye and, primarily, to the contributions of scattered light from above and below the focal plane. This precludes the use of magnifications greater than about 40X, a magnification level commonly used by slit-lamp microscopes, as greater magnifications would simply magnify defocussed light. In addition, the low resolution is partially due to blurring of the image by sources of scattered light within the broad focal plane. Thus, with a magnification of only 10X to 40X, the slit-lamp is only minimally useful in the diagnosis of corneal infection and cannot resolve cellular details.

Compared to the slit-lamp microscope, a confocal microscope has superior resolution and contrast, and would provide a significant advantage in diagnosis, if it could be adapted to clinical use. A confocal microscope produces images of ocular tissue that have enhanced contrast and resolution by reducing, compared to a conventional light microscope, the thickness of the plane of light focussed onto a subject and selectively limiting the subject-reflected light that reaches the image detector. These features result in a large reduction of scattered, out-of-focus-light contributions to the subject's image.

General aspects of confocal microscopes are described in J. W. Lichtman, "Confocal Microscopy", *Scientific American* vol. 271, no. 2, pp. 40–45 (Aug. 1994). A confocal microscope typically produces a diffraction-limited light spot that illuminates and scans the subject. Rather than move the subject through a stationary light spot, one of the several types of confocal microscope includes a spinning, perforated disk, called a Nipkow disk, the effect of which is to scan the subject. This and other aspects of confocal microscopes are described in U.S. Pat. Nos. 5,032,720 to White; 5,067,805 to Corle et al.; 5,162,941 to Favro et al.; and 5,177,512 to Abe et al. Nevertheless, a Nipkow disk is usually difficult to stabilize, and as a result, difficult to remove and replace reliably.

Laser confocal microscopes are commercially available from several sources, including Noran, Middlefield, Wisconsin. Such microscopes have not been used to view normal eyes due to the potential for eye damage from the laser light. An experimental white-light tandem scanning microscope has been used to view normal eyes. See, e.g., M. Petran et al., "The Scanning Reflected Light Microscope", *Scanning* vol. 7, p. 97 (1985); H. D. Cavanagh et al., "Confocal Microscopy of the Living Eye", *CLAO J.*, vol. 16, p. 65–73 (1990); M. A. Lemp et al., "Tandem Scanning Confocal Microscopy of the Full-Thickness Cornea", *Cornea* vol. 2, p. 205 (1986); and J. V. Jester et al., "Comparison of in vivo and ex vivo Cellular Structure in Rabbit Eyes Detected by Tandem Scanning Confocal Microscopy", *J. Microscopy* vol. 165, p. 169 (1992). Nevertheless, technical difficulties in using such microscopes in a clinical setting have included subject eye movement and inefficient interaction of the physician with the microscope. In addition, tandem scanning confocal microscopes have poor stability and very low light levels.

By solving these clinical problems, the confocal microscope's increased magnification can be used advantageously for increased resolution of cells and cellular details within the ocular tissue, cornea, anterior chamber, aqueous, vitreous, and retina. Indeed, the better resolution of smaller details obtained by using increased magnification also can permit seeing small details, such as bacteria, fungus, acanthamoebic cysts, and changes in normal cellular structure, that are important sources of diagnostic information in clinical ophthalmology.

The confocal microscope offers magnifications of up to 500X, optical sectioning of the cornea, increased image contrast, and the ability to see through corneal opacities - including those caused by edema, fibrous scarring, and suppuration.

In addition, it can be used for real time, noninvasive, repeated observation of the eye, which is of singular importance in accurate follow-up of the course of infection to evaluate treatment. With a confocal microscope, it is possible to view cells within an optical section of living tissue due to the greatly improved resolution and contrast and minimal interference.

Confocal imaging thus can be used in clinical ophthalmic practice to obtain diagnostic information of conditions, such as corneal graft rejection and endothelial dystrophies, where previously none was available. Moreover, the confocal microscope can provide the imaging capability to focus on any small object, micrometer-size or even less, disposed anywhere from the corneal surface, such as in the tear film, to the cornea, the endothelium, and the ocular lens, and even to the retina.

To use a confocal microscope effectively with a living eye, the microscope must be mounted so that the focus can be easily positioned in the tissue. Applicants have met these considerations in a way that permits the microscope's objective lens to be disposed parallel to the apex of the cornea and rotated to be tangential to the corneal surface, and the objective tip can be adjustably moved from the bottom of the eye to the top. Applicants' special mounting facilitates the use of the confocal microscope with the living human eye, which can be examined at all angles.

SUMMARY

A confocal microscope optical system in accordance with Applicants' invention overcomes the difficulties of the previous devices and can be used in diagnostic applications that are inaccessible to the previous devices.

In accordance with one aspect of Applicants' invention, a confocal optical system for forming an image of a subject illuminated by light from an illumination system includes a Nipkow disk that is perpendicular to a light propagation path and that has a surface upon which a plurality of pinholes are distributed substantially symmetrically about an axis perpendicular to the surface of the disk. The system further includes means for projecting an image of a first set of the pinholes onto a second set of the pinholes, the image being formed of light transmitted by the first set of the pinholes when the first set is illuminated by light that impinges on a first side of the disk. The system further includes a collective lens and a first objective lens for focussing light transmitted by the second set of the pinholes onto the subject and for collecting light reflected by the subject. The first objective lens has a large numerical aperture and light reflected by the subject passes through the second set of pinholes.

Finally, the system includes means for spinning the Nipkow disk about the axis.

In other aspects of the invention, the first objective lens can be a waterimmersion micro-objective lens and the projecting means can include a pentaprism, a second objective lens, and a mirror disposed along the light path. The mirror may be semi-transparent and be disposed such that light reflected by the subject passes through the mirror. The projecting means may further include a second mirror for spatially filtering light reflected by the subject and for reflecting spatially filtered light to a detector. The system may further include means for controlling the amount of light reflected by the system components, and the controlling means may include a polarizer, a quarter-wave plate disposed at an output of the first objective lens, and an analyzer disposed proximate the mirror.

BRIEF DESCRIPTION OF THE DRAWINGS

The features and advantages of the invention will become apparent from reading this description in conjunction with the drawings, in which like elements are identified by like reference numerals and in which.

DETAILED DESCRIPTION

Figure 1:
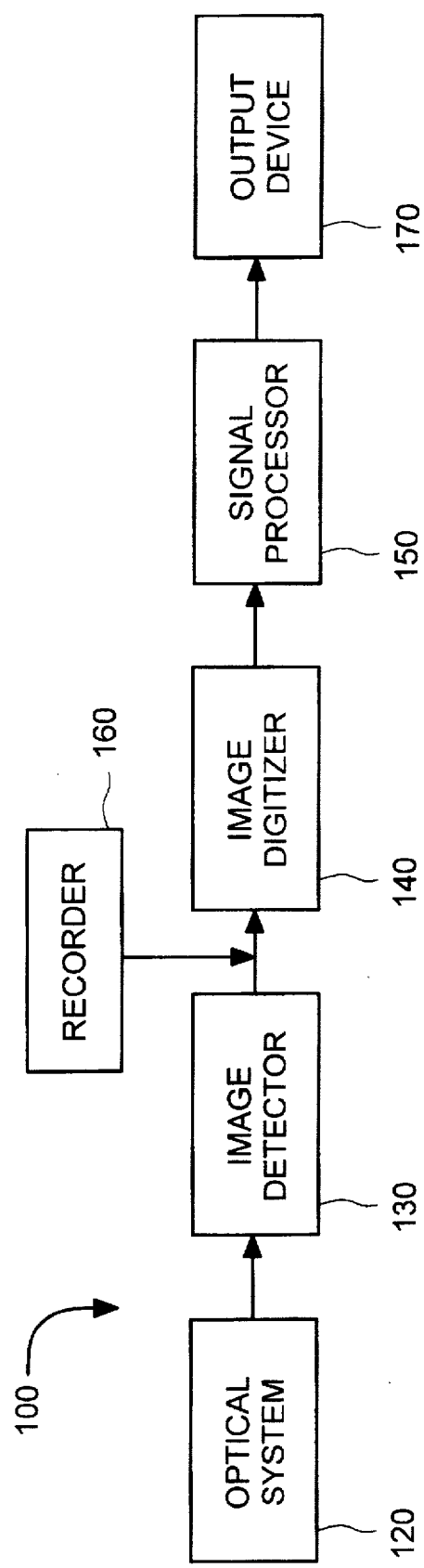
FIG. 1 is a block diagram of a confocal microscope system in accordance with Applicants' invention.

Referring to the block diagram of FIG. 1, Applicants' single-sided, masked illumination (SSMI) confocal microscope system (CMS) 100 includes an optical system 120, an image detector 130, such as a video camera, for converting the light images generated by the optical system 120 into electrical image signals, a device 140 for digitizing the electrical image signals generated by the image detector, and a signal processor 150, such as a computer, for processing the digitized electrical image signals. In addition, the SSMI CMS 100 may advantageously include a recorder 160 for storing the electrical image signals produced by the detector 130 and a hard-copy output device 170, such as a video printer.

Figure 2A:
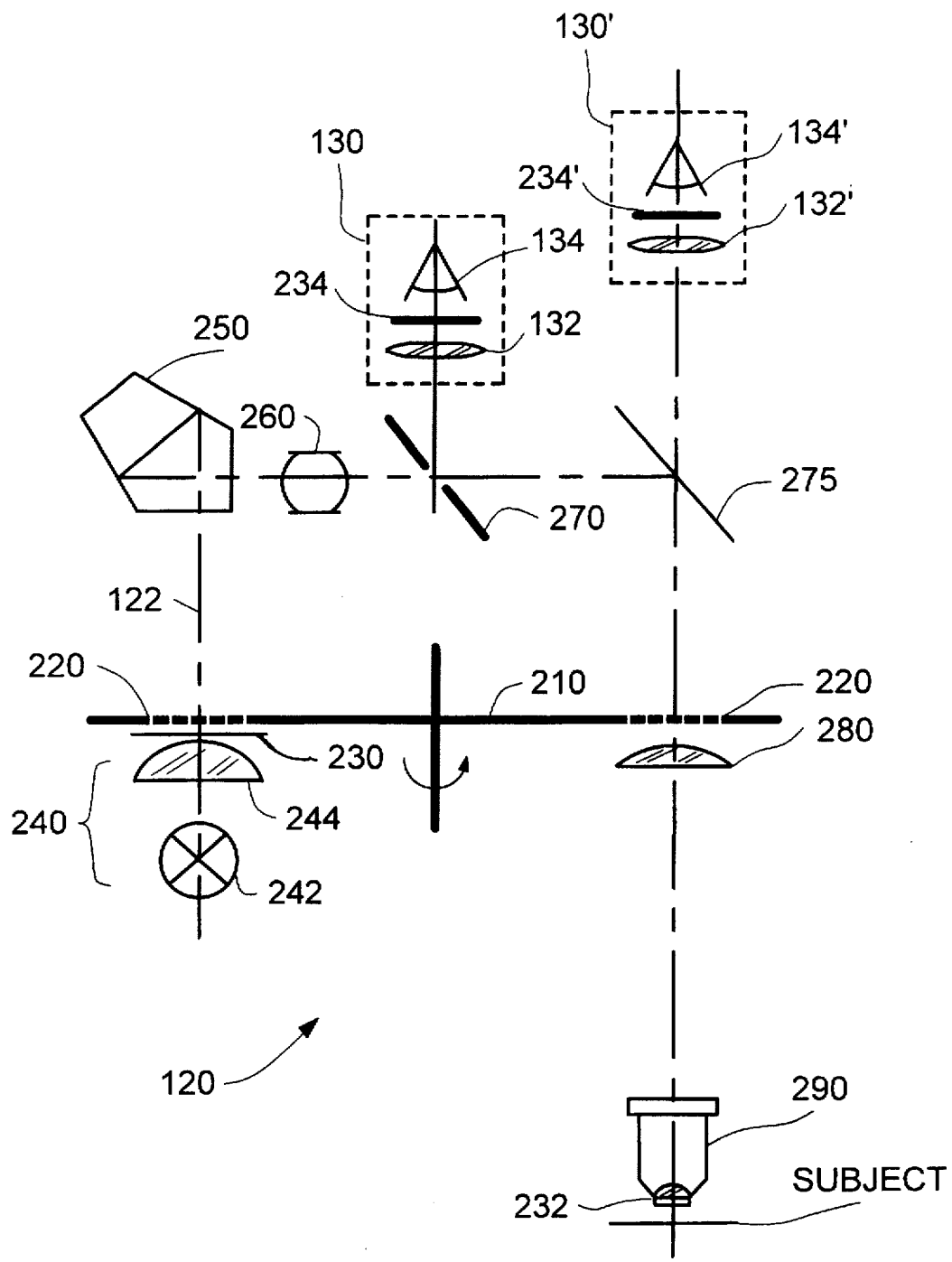
FIG. 2A is a diagram of the optical system of Applicants' confocal microscope system.

As illustrated in FIG. 2A, Applicants' optical system 120 comprises a Nipkow type disk 210, which is preferably a disk having a diameter of approximately 7–10 centimeters (3–4 inches). Approximately 14,000 pinholes 220 are symmetrically distributed about an axis perpendicular to the surface of the disk, and each pinhole preferably has a diameter between approximately thirty micrometers (30 µm) and approximately 100 µm. Such a disk transmits between about one percent and four percent of the visible light supplied by an illumination system 240, which comprises a light source 242, such as a 100-watt mercury or xenon lamp or an appropriate laser, and a suitable lens 244.

The disk 210 can be formed in a number of ways, for example, by disposing a photolithographic or gelatinous film on a glass or other suitable substrate. The photolithographic film, in which the "pinholes" are simply transparent regions rather than physical holes, is currently believed to be more advantageous because it can be thin, leading to better confocality. The disk 210 is spun about the axis at a suitable speed, generally between about 1000 and 6000 revolutions per minute, by any of a wide variety of motors, such as a magnetic induction type of motor. It is necessary only that the motor spin the disk without excessive vibration or speed variations.

It will be appreciated that although FIG. 2A illustrates the disk 210 as a unitary disk, it is possible to implement the disk 210 as two separate disks having matching pinhole patterns and synchronized rotations. One of these "sub-disks" would be disposed in front of the illumination system 240 and the other "sub-disk" would be disposed before a collecting lens 280 that is described in more detail below. Although the pinhole patterns on the sub-disks would match, they would not necessarily be identical at least to the extent that the pinholes on one sub-disk could have different diameters than the pinholes on the other sub-disk, according to the axial position of an objective lens 260.

Light from the illumination system may be directed to the rest of the optical system by a suitable optical fiber, such as a silica-core optical fiber cable. It will be understood that other, brighter lamps may be used, as well as other types of optical conductor having high transmissivity (preferably ≧95%) at the wavelengths of interest. A desire for maximal safety for uses in clinical settings would typically result in a desire for use of smaller, safer lamps.

After passing through the pinholes on one side of the disk 210, light from the illumination system 240 passes along the optical axis 122 to a pentaprism 250, which folds the light so that it passes through the objective lens 260. The combination of the illumination system lens 244 and the objective lens 260 forms an inverted image of the light source 242 at a central hole through a fully reflective mirror 270, as illustrated by the optical ray trace shown in FIG. 2B. The central hole causes the mirror 270 to act as a spatial filter and spatial beamsplitter, which has advantages that are described in more detail below.

Light from the illumination system 240 passes to a mirror 275, which re-directs it to pinholes on the other side of the disk 210 and the collecting lens 280. With the mirror 270, which provides a second viewing option that is described below, the mirror 275 may be a single-surface, semi-transparent, or dichroic reflector. The light focussed by the collecting lens 280 is further focussed by a micro-objective lens 290 onto a subject, which reflects some of that light back through the lens 290, lens 280, and pinholes in the disk 210. Since light illuminating and reflecting from the subject passes through the same pinholes, Applicants' confocal microscope can be characterized as a single-sided system.

Figure 2B:
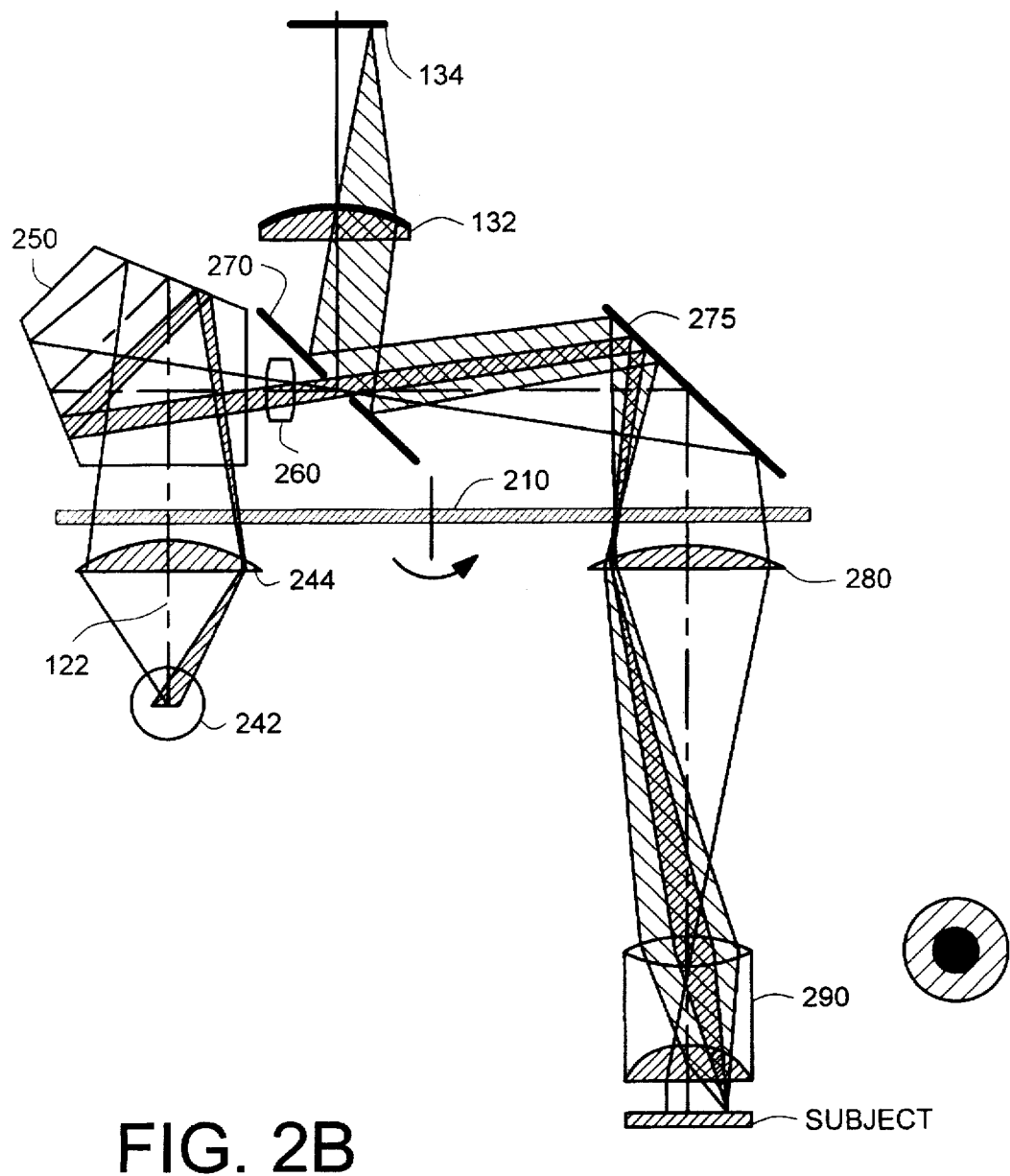
FIG. 2B is an optical ray diagram of Applicants' confocal microscope system.

Light reflected by the subject passes through the micro-objective lens 290, lens 280, and disk 210. As indicated in FIGS. 2A, 2B, this reflected light is directed by the mirror 275 toward the mirror 270, and the hole in the mirror 270 spatially filters this light such that the light reflected from the mirror 270 can be more clearly imaged by the image detector 130. The hole provides apodization for the micro-objective lens 290, i.e., masking in the Fourier plane of the lens's exit pupil. Mirror 270 may advantageously comprise individual mirrors of several different types, one or more of which may be mounted on a suitable slide mechanism that positions each mirror, one at a time, with reasonable accuracy in the optical path; critically tight tolerances for this positioning are not necessary. The mirror types may include, as noted above, a fully reflecting mirror having a hole for masking the exit pupil of the micro-objective lens 290, a dichroic mirror for fluorescence microscopy, and a semi-transparent mirror.

In FIGS. 2A, 2B, the image detector 130 is shown as comprising an eyepiece 132 and an eye or image plane 134. In FIG. 2A and as described above, the mirror 275 may be partially transparent, permitting a portion of the light reflected by the subject to pass to a second image detector 130' that is also depicted as comprising an eyepiece 132' and eye 134'. It is not necessary, however, that the mirror 275 be partially transparent; as indicated by FIG. 2B, the mirror 275 may be completely reflective or at least dichroic. It is currently believed preferable for the mirror 275 to be a semi-transparent, right-angle prism, which is a device available from many manufacturers, including Melles-Griot, Irvine, California. A prism has an advantage over a plane mirror in that the reflecting coating is sealed in the prism and thus is more stable over time.

As indicated in FIG. 2B and in accordance with one aspect of Applicants' invention, the pentaprism 250, objective lens 260, and mirror 275 cooperate to form real images of the pinholes lit directly by the illumination system 240 (i.e., the pinholes on the left side of the disk in FIGS. 2A, 2B) on the pinholes on the other side of the disk 210 (i.e., the pinholes on the right side of the disk in the figures). This arrangement has a number of important advantages.

Applicants' arrangement eases the optical alignment of the CMS 100 by permitting any necessary angular and translational adjustments to be carried out with the pentaprism 250. It will be appreciated that the pentaprism could be replaced by another means for redirecting light from the illumination system 240, such as a pair of mirrors, but a pentaprism has the advantages of compact size and vibration insensitivity. Also, because having the light pass through the same holes on its way to and from the subject significantly relaxes the requirement for accurate positioning of the disk. Applicants' device is easier to use than a conventional tandem confocal microscope.

Applicants' arrangement also reduces the scan lines in the image of the subject because less light (in principle, no light) is available for scattering from the surface of the Nipkow disk. This arrangement permits the relatively bright illumination system to be easily baffled, thereby preventing excess scattering to the sensitive image detectors 130, 130'. Stray light from the illumination system 240 is substantially completely prevented from gaining access to the viewing path because only 1-4% of the light emitted by the source passes through the pinholes in the Nipkow disk (the pinholes on the left side of the disk in FIGS. 2A, 2B). In principle, no stray reflections between the mirror 275 and the subject-side of the disk 210 (the right side of the disk in FIGS. 2A, 2B) should occur. Thus, Applicants' SSMI CMS is easier to use in a clinical setting than a conventional confocal microscope.

Because of its compact design (all of the optics but the illumination system have been packaged in a cube approximately 15 cm (6 in) on a side), Applicants' device is easily adapted to common laboratory research microscopes. For example, the package of optical components 210, 250–280 could be fabricated as a simple replacement for the structure between the objective lens and the eyepiece(s) of such a research microscope.

Advantageously, the holders for the mirrors and other components of the optical system 120 are sized to accept standard components, such as those available from Nikon for fluorescence microscopy. The increased light on the subject and the reduced scattering in Applicants' CMS permit the CMS to be used for real-time fluorescence microscopy of the living eye. The dichroic mirrors can be selected for different excitation-barrier combinations and can take advantage of different reagents for diagnostic purposes. Alternatively, separate filters can be used, one disposed in front of the illumination system and another disposed in front of the detector.

Moreover, resolution is increased by the use of a water-immersion microobjective lens 290 of high magnifying power, e.g., 20X, and high numerical aperture, e.g. 0.8. For ophthalmic use, the micro-objective lens's front surface preferably has a radius of curvature that permits contact with the spherical cornea. The design of the micro-objective lens would then also have to account for the optical characteristics of the cornea, which are similar to those of water. Suitable micro-objective lenses are commercially available, for example from Bio-Optics, Boston, MA. The microobjective lens should be easily replaceable, enabling use of objectives that are optimal for particular examinations, e.g., of the retina, but it is generally not necessary to replace the objective lens, e.g., for examination of fingernails.

Rather than tilting the disk 210 as in some previous confocal microscopes, the plane of Applicants' disk is substantially normal to the optical axis 122. In Applicants' optical system 120, problems caused by disk reflections are reduced by imaging one set of pinholes onto another set, as described above and by the spatial filtering of the hole in the mirror 270. Problems caused by retro-reflections in the optical system can be further minimized by using a photo-lithographic process to form the pinholes accurately in the disk, by providing anti-reflection coatings on the several optical components, and by using polarized light. As noted above, polarized light can be conveniently provided by a laser included in the illumination system 240. Accordingly, FIG. 2A shows a polarizer 230 disposed at the illumination system 240 that cooperates with a quarter-wave plate 232 disposed at the output of the micro-objective lens 290 and with analyzers 234, 234' at the image detectors 130 to control the amount of light reflected from optical system components that reaches the focal planes or detectors 134, 134'. Moreover, the real-time digital image processing provided by the image digitizer 140 and signal processor 150 also facilitate enhanced resolution. These improvements and their importance to the improved performance of Applicants' CMS are described in more detail below.

It will be appreciated that it is desirable for the mechanical design of the SSMI CMS 100 to permit easy replacement of the Nipkow disk, enabling use of disks having hole patterns optimized for specific purposes, such as viewing the corneal surface or viewing the retina. For example, a disk having a pattern of slits may be more useful than a disk having round holes for viewing features of the tear film and of the cells at the surface of the cornea. Slits are currently believed to provide better resolution than round holes but also less depth of field due to a loss of confocality.

Also, the Nipkow disk may simply be removed from the light path, giving Applicants' SSMI CMS a non-confocal mode. Thus, Applicants' SSMI CMS would have capabilities similar to the clinical slit-lamp microscope, as well as the capabilities of a confocal microscope. The SSMI CMS could be used in a confocal mode (i.e., with the Nipkow disk in place) for close examination of tissues like the eye, including the cornea, lens, and iris. The SSMI CMS could be used in a white-light mode (i.e., with the Nipkow disk removed) for operation similar to a slit-lamp microscope.

For converting light images generated by the optical system 120 into electrical signals for processing, the image detector 130 advantageously includes a video camera, such as the Model CCD 200E made by VideoScope International, Washington D.C., rather than the eyes 134, 134' depicted in FIG. 2A. This camera has a 760×480 element detector. The analog video signals generated by the camera 134 are digitized by the device 140, such as a video frame grabber board installed in the computer 150. Suitable frame grabbers are commercially available from a number of manufacturers, such as the model OFG made by Imaging Technology.

The digitized image signals may be stored in a memory device (floppy diskette, hard disk, compact-disk memory, etc.) connected to the processor 150, such as an 80486-class or better personal computer, under the control of a software program. We have used a program called Optimas that is commercially available from Bioscan, Inc., Seattle, Washington, although other software applications could be used.

As indicated in FIG. 1, images may also be stored in analog form by the recorder 160, which may be a conventional video cassette recorder; the combination of digital and analog image storage is preferable because it permits on-line image enhancement and off-line morphometric analysis as described below. Paper copies or other forms of the digitized images can be produced by the output device 170, which may be a printer such as a Model UP-5000 video printer made by Sony.

Applicants' SSMI CMS yields magnifications of up to approximately 500X. The device can be used for real-time optical sectioning of the cornea and other biological structures in vivo with superior axial resolution and the ability to see through obstructions such as corneal opacities due to edema, fibrous scarring, and suppuration. A unique feature of this instrument is the ability to optically section living structures in planes parallel to the surfaces of the structures. Optical sectioning is carried out by moving the plane of focus either manually step-wise through predetermined intervals of, say, 10 μm, or automatically continuously by a motorized advance of the micro-objective lens.

Applicants' SSMI CMS can be used more advantageously than a scanning laser confocal microscope for viewing the retina and optic nerve head. The SSMI CMS can carry out automated imaging of the corneal endothelium more advantageously than the in vivo specular microscope; in particular, Applicants' SSMI CMS can be used in conditions in which the specular microscope is unusable. Moreover, The SSMI CMS can carry out automated imaging of the corneal epithelium, which cannot be performed by any current instrument.

Applicants' SSMI CMS was used for in vivo examination of the cornea in rabbits with experimental bacterial and fungal keratitis. The animals were anesthetized, and in vivo examination was performed with the aid of an eyelid speculum. Compared to slit-lamp microscopy, the SSMI CMS provided superior lateral and axial resolution and serial optical sectioning capability, which is useful for identification of corneal pathogens in the early stages of infection. It will be appreciated that a slit-lamp-microscope examination would have provided no information about pathogens since they would not have been viewed at all due to the slit-lamp microscope's low magnification; using a slit-lamp microscope, only the general region of the infection would have been examined.

Also, a human cornea removed by penetrating keratoplasty after a clinical diagnosis of amoebic keratitis was examined with Applicants' SSMI CMS. In the early stages of bacterial infection, slit-lamp-microscope examination revealed a nonspecific minimal stromal haze and limbal injection indistinguishable for sterile ulcers and epithelial defects. With the SSMI CMS, bacteria were visible as highly refractile bodies in the epithelium and superficial stroma. Branching fungal hyphae were also easily identified using the SSMI CMS, as were amoebic cysts and parasites in the subepithelial stroma.

Thus, Applicants' SSMI CMS has made it possible to visualize infected corneas noninvasively, in real time, at magnifications adequate to determine cellular details and pathogen morphologies, even at very early stages of disease.

Applicants' method for measuring the distribution of cells in the corneal epithelium and cell density in the endothelium is described below and illustrated as flow charts in FIGS. 3A, 3B, 3C. The method, which is advantageously carried out by the processor 150 operating under the direction of a software program, determines the spatial distribution of cells in both normal and abnormal conditions. Aberrant cellular spatial distributions can be detected by comparison to a normal cell distribution, for example on the anterior and posterior surfaces of the cornea. Such information is useful for examining solution toxicity, contact lens wear, recovery after surgery, wound healing, and disease processes.

In general, Applicants' method is based on the distinctive reflective properties of the cell nucleus and the position of the nucleus relative to the cell body and neighboring cells. For example when imaging the anterior or epithelial surface of the cornea, Applicants' SSMI confocal microscope shows the cell nuclei as white bodies disposed on a darker background. Advantageously, no particular arrangement of cells is presumed since Applicants' method localizes each cell nucleus independently and determines the distance of each nucleus from neighboring cell nuclei. Based on the assumption that each cell has only one nucleus located near the geometric center of the cell, the detection and location of each nucleus are in effect determinations of the presence and location of each cell.

For example, the surface of the corneal endothelium is typically a regular hexagonal or approximately hexagonal arrangement of cells. Applicants' method indicates the cell borders and determines their spatial density, i.e., the number of cells in a given area. Moreover, Applicants' method can determine the areal distribution of spatial density, i.e., the number of cells per unit area as a function of position on the endothelial surface. In this way, Applicants' method provides for determining changes in cell density that can occur as a result of corneal endothelial disease, contact lens wear, dystrophies, surgery, or intra-ocular lenses.

Image Acquisition

Figure 3A:
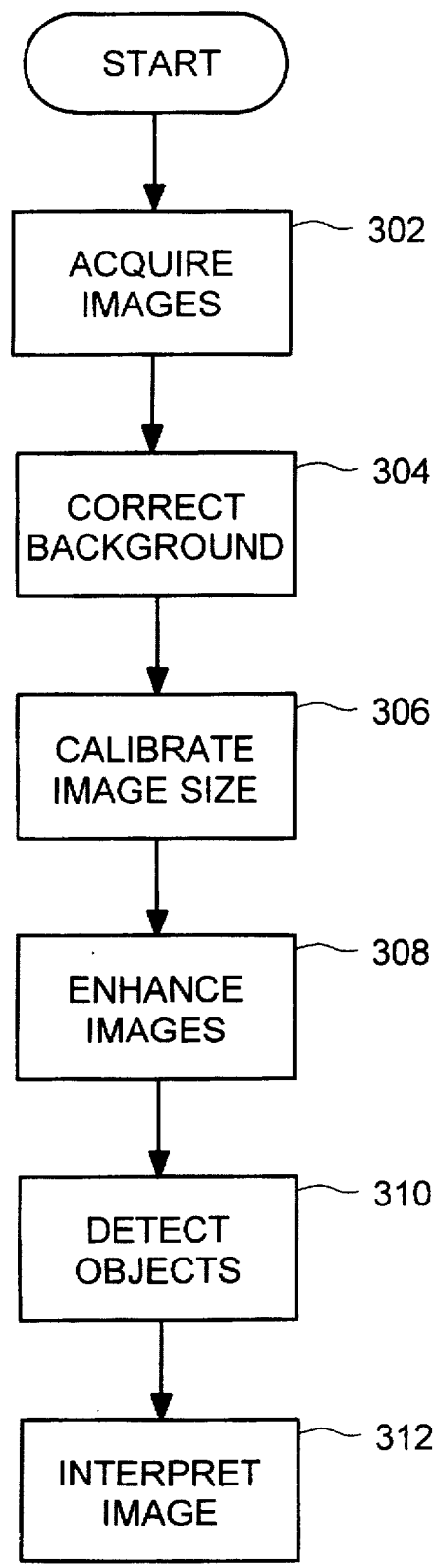
FIGS. 3A, 3B, 3C are flowcharts of the image processing carried out by Applicants' confocal microscope system.
Figure 3B:
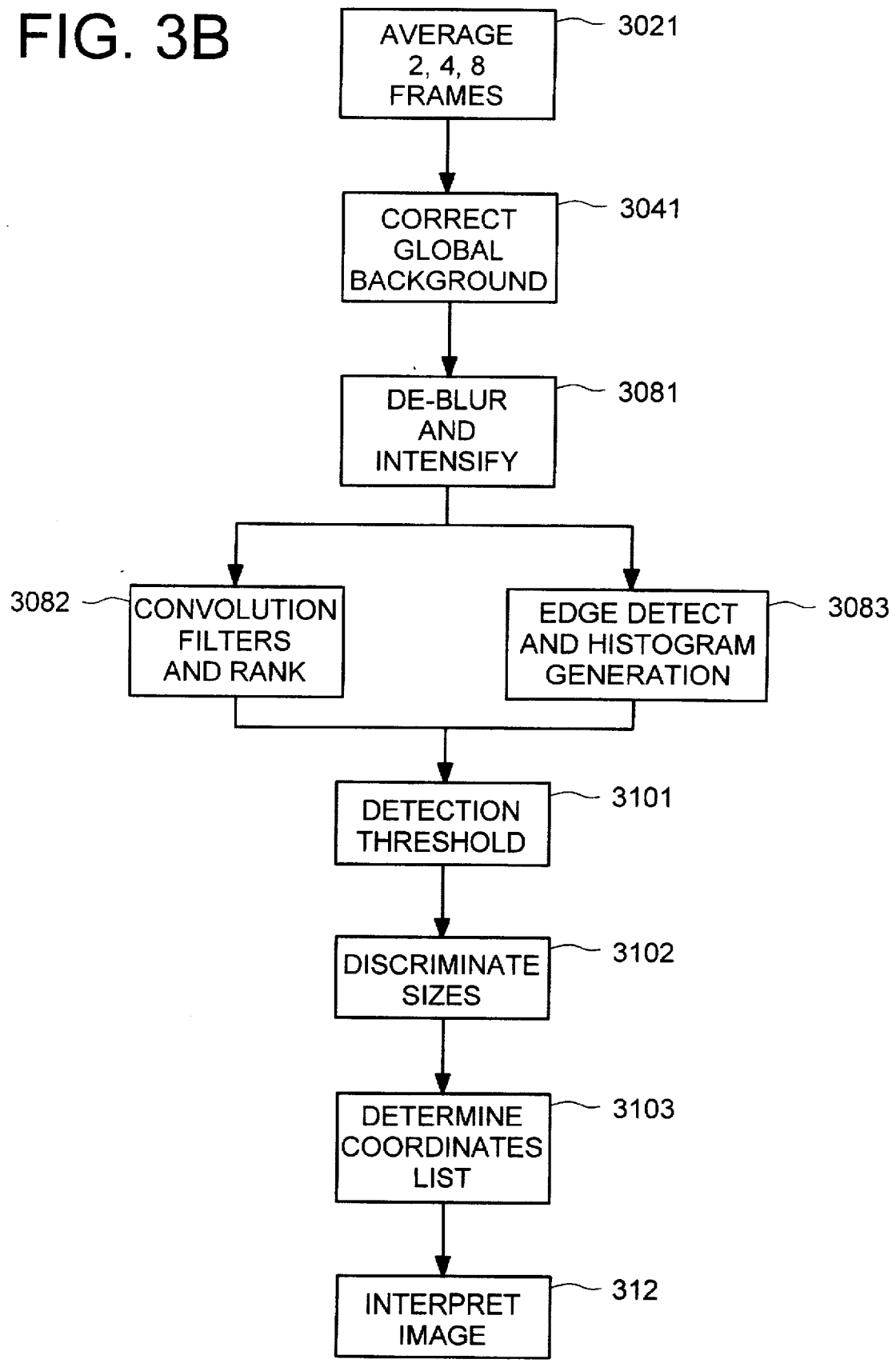
Figure 3C:
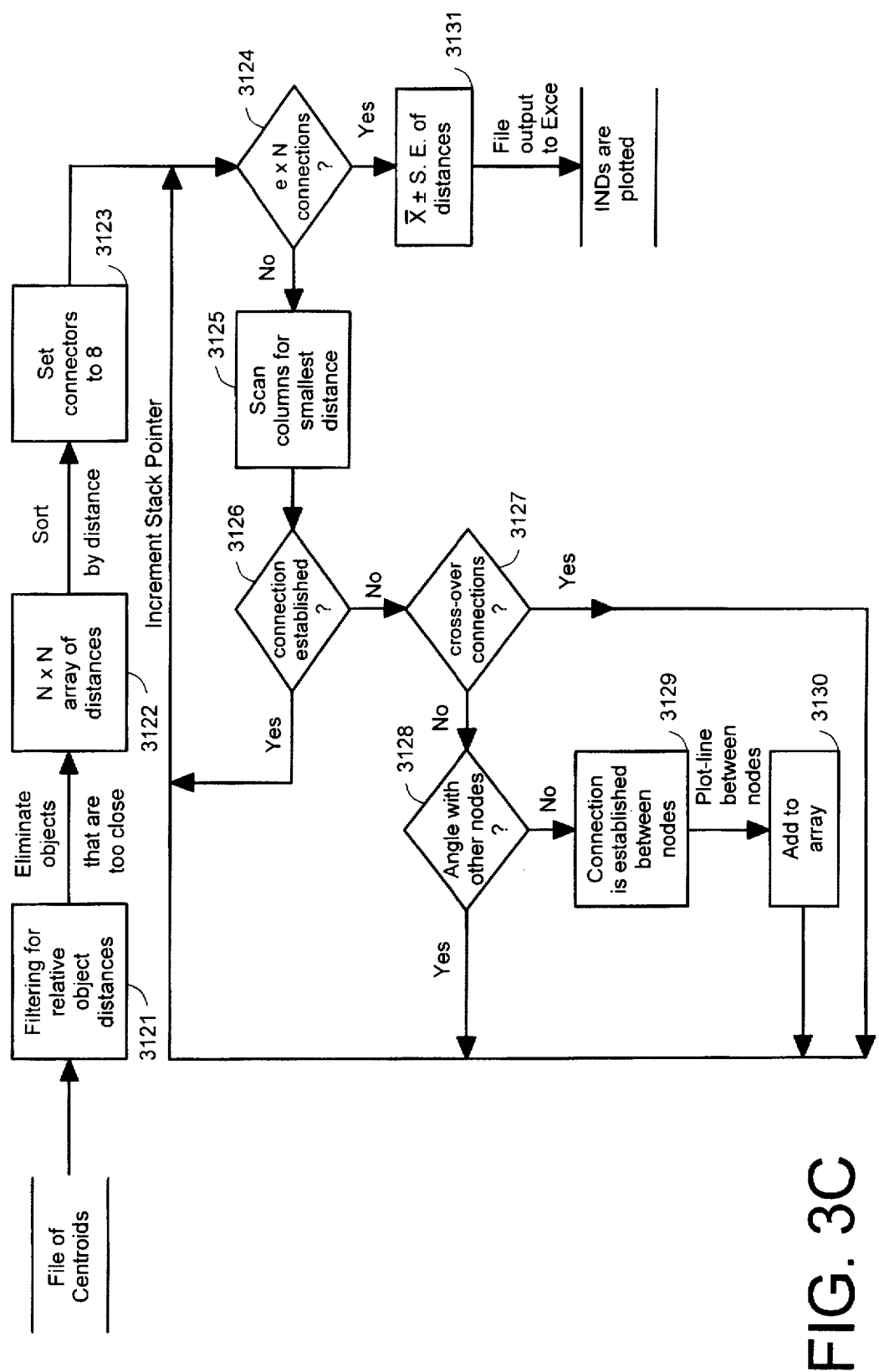

Referring now to FIGS. 3A, 3B, the first step 302 is acquiring images to be processed. The electrical image signals acquired by the signal processor 50 can be derived from archival image signal recordings stored on videotape or other media and read by the recorder 160 and from images of "live" subjects viewed by the optical system 120. Image signals that are formatted as analog video are digitized by the frame grabber board 140, and the computer 150 writes the digitized image signals to a hard disk or other suitable memory.

The images produced by Applicants' SSMI CMS show almost no visible scan lines due to the imaging of the pinholes that is described above. Normally, the spinning Nipkow disk results in highly visible scan lines that tend to degrade the resolution of the image, and disturb the viewer's perception of the image.

To reduce image artifacts still further, the digital image signals may be smoothed by averaging several successive video frames pixel by pixel. This step is indicated in FIG. 3B by the block 3021. An average of only two to four frames will usually reduce noise by a useful amount. Many current desktop computers can easily form the averaged digital image signal if it is down-sampled, i.e., if it has a frame rate lower than the non-averaged signal by a factor of the number of frames averaged. It will be appreciated that the processor 150 could instead be fast enough to form running averages of the video signals, which would result in an averaged video signal having the same frame rate as the non-averaged image signal.

Background Correction

Following the step of image acquisition, the method carries out the step of background correction 304, by which the image's brightness level over the field of view is corrected. It will be appreciated that the brightness level over the field of view is usually skewed in some way. Images are generally brightest at some point near the center of the frame, and the brightness decreases radially from this point to the edges, sometimes substantially. An image is corrected, i.e., made to have a brightness level that is more constant over the field of view, by subtracting the image from an earlier image of a constant background (see step 3041 in FIG. 3B); this results in a new, corrected image having an apparently consistent level of illumination.

Size Calibration

For cell densities and other quantitative information generated by the SSMI CMS 100 to have standard units of measurement, distances in the images produced by the optical system 120 should be calibrated, in micrometers for example. The step of such size calibration 306 can be carried out by either processing an image of a microscopic scale, such as an object having a known size, or by calculating the image magnification from the optical settings of the microscope. Applicants have found it advantageous to calibrate the SSMI CMS by imaging a glass slide having graduated-scale markings of 10-µm and 100-µm intervals. Subsequent image measurements are then referenced to the calibration image, which need not change if the subsequent measurement conditions remain the same.

Enhancement

The pre-processed image signals generated by the preceding steps are then enhanced (step 308 in FIG. 3A). Using the Optimas software, nine simple convolutions are applied to the image signals and the resulting signals are summed (block 3082 in FIG. 3B). Next, the cosine of the square root of the resulting image is determined, yielding an image signal having high-contrast representations of cell nuclei against a background field. This image signal is further processed as described below.

In the first step of image enhancement, the pre-processed image signals are effectively passed through intensity and sharpening, or de-blurring, convolution filters (block 3081 in FIG. 3B), and the resulting image signals are passed through a series of up to four convolution filters, of 5×5 kernel (block 3082). The intensity and sharpening convolution filters may advantageously include a dilation filter; an erosion filter; an unweighted averaging with a sharpening convolution dilation filter; and an unweighted averaging filter.

Image signals intensified and sharpened by the convolution filters are also provided to a Frei-Chen edge-detection process (block 3083), which is provided by the Optimas software as a macro. Binarization of the pre-processed image signals by applying up to four medium filters is necessary to make the Frei-Chen procedure appropriate for object detection. It has been found that the binarization steps can be carried out more quickly and are more noise-tolerant than the edge-detection steps. These initial processing steps can be provided by the Optimas software as a macro command.

Object Detection

The image signal having the high-contrast representations of cell nuclei against a background field is then analyzed to detect the presence of the objects of interest (step 310 in FIG. 3A). Three criteria of interest in this analysis, at least in a medical application, are the threshold signal level for distinguishing a potential object from the background field (step 3101 in FIG. 3B); the area covered by a potential object, i.e., its size (step 3102 in FIG. 3B); and the circularity or roundness of the potential object (also step 3102).

In estimating the threshold gray level of the image signal (step 3101), it is necessary only to ensure that the threshold is such that all objects of interest, e.g., cell nuclei, are included in the thresholded image. This is not difficult because cell nuclei are significantly brighter than the background and can serve as reliable indicators of the presence and positions of the cells. One way to set the threshold level is simply to base it on the average of the brightest and dimmest pixels.

Pixels in the image signal that have signal levels falling below the threshold are regarded as background. Pixels having signal levels exceeding the threshold are candidates to be considered as nuclei. The Optimas program automatically highlights all candidate objects, which typically will include actual cell nuclei and inadvertently enhanced artifacts.

Next (step 3102), candidate objects are discarded if they are not particularly round or if they are of unreasonable size (either too large or too small). For ophthalmic uses, the cell nuclei have sizes and circularities that are relatively constant. Thus, the distributions (gaussian, gamma, etc.) of these parameters for the candidate objects in a given image may be determined and used as criteria for discarding candidate objects, e.g., outliers may be eliminated from further consideration. For example, it has been found that the sizes of corneal epithelial cells follow a gamma distribution.

The result of these steps is a list of coordinates corresponding to cells in the sample (step 3103 in FIG. 3B). Under the control of the Optimas software, the computer 150 writes a data file to the hard disk for subsequent processing in accordance with Applicants' invention. This file is the list of pairs of image coordinates, each representing the location of the center of mass of a respective candidate object that was not excluded during the object detection process. These pairs theoretically represent the coordinates of the cell nuclei, and are thus calibrated indications of the geometric centers of the cells.

Image Interpretation

In accordance with one aspect of Applicants' invention, the image signals in the data file are further processed by the computer 150 under the control of another software program that Applicants call August. As indicated by block 312 in FIG. 3A, this program, which has been developed by Applicants in the C++ computer language, interprets the image data files as described below. Of course, it will be understood that image interpretation can be carried out by other methods and by software written in other programming languages. It is necessary only for the positions of cell nuclei to be identified, such as in the manner described below in more detail in connection with FIG. 3C. Moreover, the process of image interpretation might be carried out by presenting the image to an operator and having the operator "point and click" on the positions observed.

Because some entries in the data file of potential cell centroids probably do not represent the coordinates of real cell nuclei, an object-verification process is carried out. In the first step of this process (block 3121 in FIG. 3C), it is determined whether any of all possible pairs of candidate nuclei are within a predetermined distance of each other, e.g., 10 µm, and each such pair is replaced by one data file entry that is the image coordinates of the midpoint between the two replaced candidate nuclei. The result of this step is a sorted array of distances between candidate objects that is illustrated by block 3122 in FIG. 3C.

Next, the distance between each remaining candidate nucleus and its nearest neighbor is determined based on map-theory algorithms. In essence, the position of each nucleus is plotted and lines are drawn between nearest neighbors according to a set of rules. For example, a line is not drawn if it will cross a line already drawn or if it will make a connection that is longer than a predetermined distance, e.g., 120 µm, which is greater than twice the diameter of an average epithelial cell. Also, a line would not be drawn if it would proceed outward at the border of a region of interest or if it would extend past a nearest neighbor. This process is illustrated by the remaining blocks in FIG. 3C.

Block 3123 indicates that each candidate object is assumed to have no more than eight connections to other candidate objects, i.e., that each cell has no more than eight nearest neighbors. It will appreciated that this assumption might change according to the subject under study. Decision block 3124 reflects an empirically based assumption that the total number of connections among a number N of candidate objects is Nxe, where e is the exponential value. If that number of connections has not yet been established, the process proceeds to block 3125, and the array of candidate object distances is scanned for the smallest entry remaining in the array or stack, as identified by means such as an incremented stack pointer. If it is decided in block 3126 that there no connection has been established for this entry, a connection is hypothesized and then evaluated.

First, it is decided (block 3127) whether the hypothesized connection crosses over an already existing connection. If so, the hypothesized connection is deleted, the stack pointer is incremented, and the process returns to decision 3124 because, as mentioned above, connections that cross other connections are not allowed. If the hypothesized connection does not cross another connection, the angles created by the hypothesized connection and other connections already established for the two candidate objects joined by the hypothesized connection are evaluated (block 3128). If the angles created have inappropriate magnitudes (either too large or too small), the hypothesized connection is deleted, the stack pointer is incremented, and the process returns to decision 3124. If the angles created have appropriate magnitudes, the hypothesized connection is established (block 3129) and added to an array or data file of coordinates or other information corresponding to the objects (cell nuclei) joined by such connections (block 3130), the stack pointer is incremented, and the process returns to decision 3124. On a visual display of the information, a line might be plotted between the candidate objects joined by the connection, as illustrated for example in FIG. 4A.

Figure 4A:
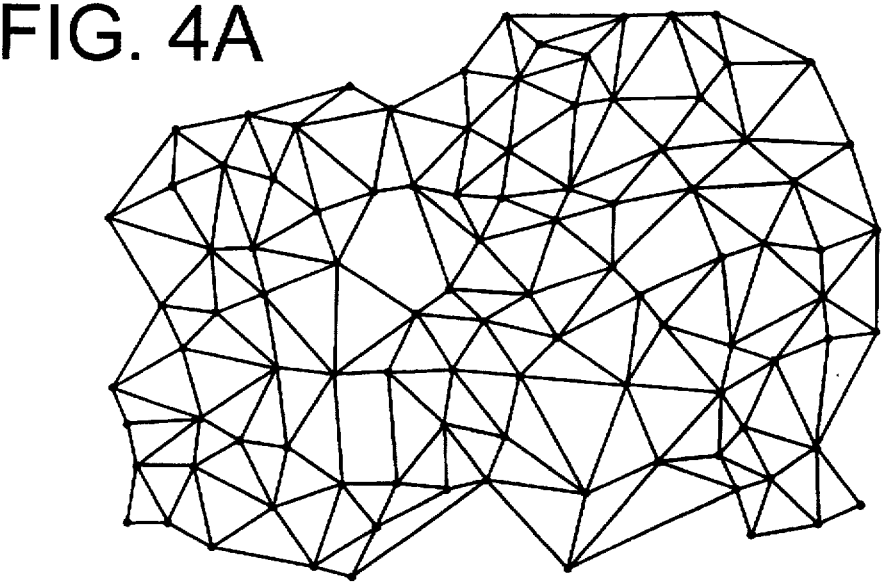
FIG. 4A is a processed image showing the positions and inter-nuclear distances of cell nuclei observed with Applicants' confocal microscope system.

If the decision 3124 indicates that the expected number of connections has been established, it is often useful to determine the mean internuclear distance $\bar{x}$ and the standard error of the array of such distances. The results of such processing of an image of a human corneal epithelium are illustrated in FIG. 4A, in which the nuclei are located at the intersections of the straight line segments representing the established connections. The variation in the distances between cell nuclei that can be seen in FIG. 4A arise from many causes, such as movements and size changes of cells as they mature and gaps due to cell losses.

The distances may be used to determine the spatial density of the cells and the spatial distribution of the spatial density. Also, the results may be presented on the display of the computer 150 as a map having highlighted areas of increased and decreased cellular density, a count of the number of cells on the map, and statistical indicators of nearest neighbor distances. The steps used to generate and display such a map can be readily programmed by one of ordinary skill in C++.

A data file, or list, of these inter-cell distances is generated, and the data file can be reported to a data management application program, perhaps for statistically analyzing the information. Suitable statistical analysis software is commercially available, for example the Statistica application made by Statsoft, Tulsa, OK. For example, a histogram of intracellular distances might be generated and plotted. Peaks in such a histogram would represent areas of high and low cellular density. It has been found that changes in the histogram and statistical results can be discerned even when as few as four cells are deleted from the sample.

Figure 4B:
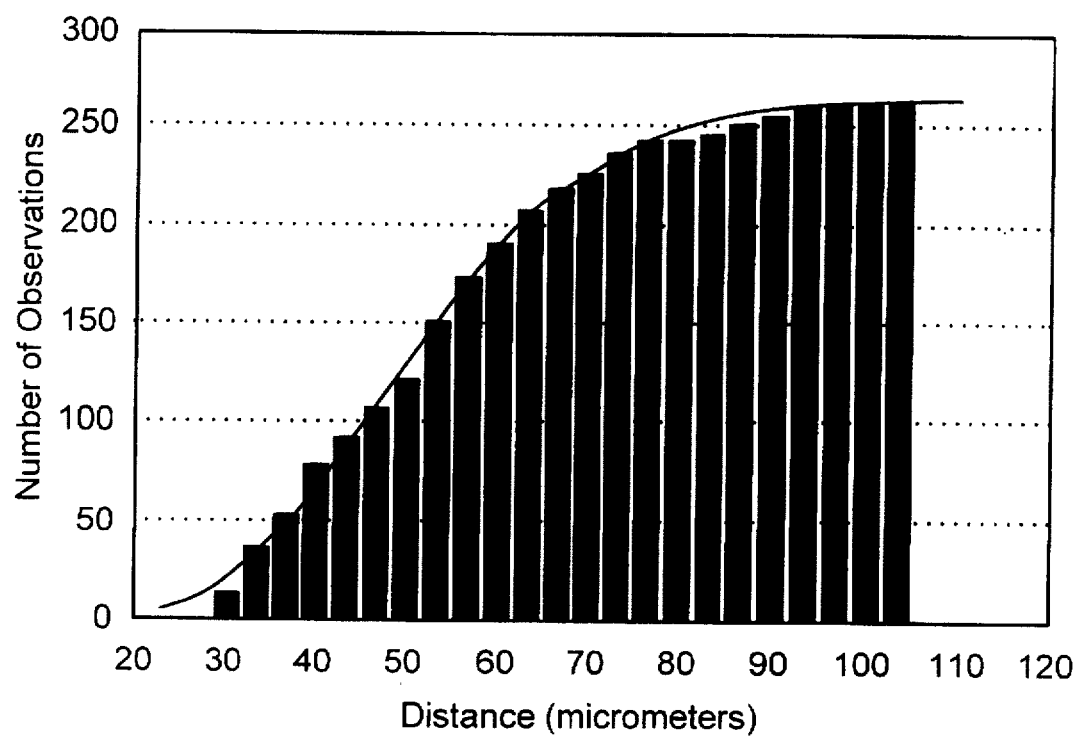
FIG. 4B is a plot of the distribution of the inter-nuclear distances in the image of FIG. 4A.

The distribution of inter-cell distances may be asymmetric about the mean, tailing off more in the direction of greater distances. Applicants determined that the distances derived from the image shown in FIG. 4A were best fit by a gamma distribution, which is illustrated in FIG. 4B, having an α (shape) parameter of 11.01 and a β (scale) parameter of 0.20.

It is believed that Applicants' SSMI CMS can replace the slit-lamp microscope and Scheimpflug camera, as well as the specular microscope, and have applications including observation of (1) the effects of contact lenses on corneal structure, particularly the anterior, cellular epithelial surface and the innervation; (2) the timecourse of corneal-wound healing after surgical procedures for refractive changes of the cornea; (3) non-healing indolent ulcers; and (4) wounds that are associated with surgery, trauma, contact-lens wear, or bacterial ulcers. In observing the effects of laser refractive surgery, Applicants' SSMI CMS should enable measuring the depths of linear and curved corneal incisions.

Applicants' SSMI CMS should also enable one to observe real-time changes in the cellular constituents of the cornea, providing increased diagnostic information regarding the effects of pharmacological and therapeutic agents on the epithelium, stroma, and endothelium. For example, the time course of epithelial regrowth following laser surgery should be easy to follow. The thickness of the epithelium can be measured, and the individual cells of each layer of the epithelium can be studied and quantified. Also, blinding corneal infections, such as acanthamoeba, bacterial infections, and fungal infections can be diagnosed in vivo without recourse to biopsies. Not only would diagnostic accuracy be enhanced, but treatment could be initiated sooner, without the period now needed to obtain biopsy results. Furthermore, corneal degenerations and dystrophies can be diagnosed with greater accuracy, and the information made available from the cellular level could facilitate understanding the time course of such conditions. Corneal endothelial cell densities and shapes can be assessed even in hazy, cloudy, or edematous corneas, permitting closer observation of endothelial cell function after corneal surgery, in cases of graft rejection, or in other situations where edema or haze have intervened.

Applicants' SSMI CMS also enables observation of the nerve fiber layer in the retina, which is otherwise translucent and almost invisible to the naked eye. Indeed, Applicants' SSMI CMS may replace the scanning laser ophthalmoscope as the preferred method of evaluating the retina and optic-nerve head. The retinal pigment epithelium, the subretinal space, and inclusions or changes in retinal cell density due to masses or subretinal edema should be observable and quantifiable with Applicants' SSMI CMS, even when viewed through a cataract. Applicants' SSMI CMS should reduce or even eliminate the need for hazardous biopsies of retinal tumors, and the SSMI CMS should enable visualization of the three-dimensional extent of choroidal melanomas.

The ability to quickly and easily locate foreign bodies anywhere in the eye, from the cornea to the aqueous, lens, and vitreous, is expected to be greatly enhanced by using Applicants' SSMI CMS. Evaluation of cataracts in the ocular lens may be carried out with Applicants' confocal microscope, as can optical sectioning of the entire cornea and ocular lens. Such serial optical sections can be used for threedimensional reconstruction of diagnostic information for evaluation of the eye's normal structure, any pathological changes, and any inclusions from infectious agents.

It will also be recognized that Applicants' SSMI CMS may be used for evaluation of conditions and diseases of the nails of the hand and foot and other body tissues. Applicants' SSMI CMS enables understanding and evaluating the structure of the fingernails, nail bed, and cellular components of the nail bed. Diagnosis and evaluation of infectious agents, particularly fungi, attacking the nails may be carried out, eliminating the need for biopsies or nail removal. Such diagnoses should be more precise, as should the prescribed treatments and the evaluations of these therapeutic interventions. These uses of Applicants' SSMI CMS are described in co-pending U.S. Pat. Application No. 08/686,986 by Stephen C. Kaufman filed on July 25, 1996, entitled "Method of Diagnosis of Diseases Using a Confocal Microscope".

Applicants' SSMI CMS can distinguish among general types of fungus infections in both the cornea and the nails. Morphological differences between branching dermatophyte in the nail and aspergillus in the cornea, and small collected type candida in both the nail and the cornea, are apparent from observation of the video output of Applicants' SSMI CMS. Thus, diagnostic information can be obtained immediately upon examination. In the past, nail scrapings and corneal biopsies, and 5-7 days of growth time, were needed to obtain this diagnostic information.

Also, it is believed that Applicants' SSMI CMS will be useful for evaluating melanomas of the skin, the borders of such melanomas, other tumors of the skin, and basal-cell carcinomas, for example, and the SSMI CMS will enable evaluation of the margins of these tumors for more precise surgical excision. These types of examinations should be able to be carried out even without computer image enhancement through the Optimas and August software.

As described above, Applicants' SSMI confocal microscope has broad clinical application in both ophthalmology and dermatology. It enables the precise cellular understanding and evaluation of normal structures and pathological changes, as well as the localization of infectious agents and foreign bodies. One's ability to carry out early diagnosis and evaluate a prescribed treatment is greatly enhanced with confocal microscopy.

It is, of course, possible to embody Applicants' invention in specific forms other than those described above without departing from the spirit of their invention. The embodiments described above are merely illustrative and should not be considered restrictive in any way. The scope of Applicants' invention is determined by the following claims, rather than the preceding description, and all variations and equivalents that fall within the scope of the claims are intended to be embraced therein.

What is claimed is:

1. A confocal microscope optical system for forming an image of a subject illuminated by light from an illumination system, comprising:

a disk disposed perpendicularly to a path along which light is intended to propagate and having a plurality of pinholes distributed substantially symmetrically about an axis perpendicular to the disk;

means for projecting an image of a first set of the plurality of pinholes onto a second set of the plurality of pinholes, wherein the image comprises light transmitted by the first set when the first set is illuminated by light that impinges on the first set from a first side of the disk;

a collective lens and a first objective lens for focussing light transmitted by the first set and the second set onto the subject and for collecting light reflected by the subject, wherein the first objective lens has a large numerical aperture and light reflected by the subject passes back through the second set; and means for spinning the disk about the axis.

2. The system of claim 1, wherein the first objective lens is a water-immersion micro-objective lens.

3. The system of claim 1, wherein the projecting means comprises a pentaprism, a second objective lens, and a mirror disposed along the light path.

4. The system of claim 3, wherein the mirror is semi-transparent and is disposed such that light reflected by the subject passes through the mirror.

5. The system of claim 4, wherein the projecting means further comprises a second mirror for spatially filtering light reflected by the subject and for reflecting spatially filtered light to a detector.

6. The system of claim 4, further comprising means for controlling an amount of reflected light, wherein the controlling means comprises a polarizer, a quarter-wave plate disposed at an output of the first objective lens, and an analyzer disposed proximate the mirror.

7. In a confocal microscope, an optical system for forming a light image of a subject, comprising:

an illumination system for generating and directing light along a light path;

a disk disposed perpendicularly to the light path and having a plurality of pinholes distributed substantially symmetrically about an axis perpendicular to the disk;

means for projecting light transmitted by a first set of the plurality of pinholes illuminated by light directed by the illumination system at a first side of the disk onto a second set of the plurality of pinholes, the projecting means being disposed on a second side of the disk opposite to the first side and comprising a pentaprism, a first objective lens, and a mirror disposed along the light path; and a collective lens and a second objective lens for focussing light onto the subject and for collecting light reflected by the subject, wherein the second objective lens has a large numerical aperture and light reflected by the subject passes back through the second set of pinholes.

8. The system of claim 7, wherein the second objective lens is a waterimmersion micro-objective lens.

9. The system of claim 7, wherein the mirror is semi-transparent and is disposed such that light reflected by the subject passes through the mirror.

10. The system of claim 7, wherein the projecting means further comprises a second mirror for spatially filtering light reflected by the subject and for reflecting spatially filtered light to a detector.

11. The system of claim 7, further comprising means for controlling an amount of reflected light, wherein the controlling means comprises a polarizer, a quarter-wave plate disposed at an output of the second objective lens, and an analyzer disposed proximate the mirror.

12. The system of claim 1, wherein the collective lens and a second objective lens are disposed on the first side of the disk.

13. The system of claim 7, wherein the collective lens and the second objective lens are disposed on the first side of the disk.

* * * * *